(12) United States Patent
McDermott

(10) Patent No.: US 11,794,557 B2
(45) Date of Patent: Oct. 24, 2023

(54) HEAT EXCHANGER WITH TILTED OR NON-VERTICAL ORIENTATION

(71) Applicant: MAHLE International GmbH, Stuttgart (DE)

(72) Inventor: David McDermott, Commerce Township, MI (US)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 17/676,320

(22) Filed: Feb. 21, 2022

(65) Prior Publication Data
US 2023/0264540 A1    Aug. 24, 2023

(51) Int. Cl.
*B60H 1/32* (2006.01)
*F25B 39/04* (2006.01)

(52) U.S. Cl.
CPC ......... *B60H 1/3223* (2013.01); *B60H 1/3227* (2013.01); *F25B 39/04* (2013.01); *B60H 2001/3291* (2013.01)

(58) Field of Classification Search
CPC ... F28F 3/025; F28F 3/08; F25B 39/04; F25B 2339/043; F25B 2339/045; B60H 1/3223; B60H 1/3227; B60H 2001/3291
See application file for complete search history.

(56) References Cited

U.S. PATENT DOCUMENTS

| 9,816,760 B2 * | 11/2017 | LePoudre | ............. F28D 9/0043 |
| 10,670,344 B2 * | 6/2020 | Ito | ............................ F24F 13/30 |
| 2009/0255650 A1 * | 10/2009 | Magill | .................... F28F 27/02 |
| | | | 165/103 |

* cited by examiner

*Primary Examiner* — Marc E Norman
(74) *Attorney, Agent, or Firm* — Dickinson Wright PLLC

(57) ABSTRACT

A heat exchanger for a motor vehicle that includes at least two flat tubes and at least two corrugated fins. The flat tubes and the corrugated fins are stacked alternately one above the other in a height direction (HR) to form a stack. The flat tubes and the corrugated fins are displaced in the stack in such a way that a central height axis (HMA) of the stack is aligned at an inclination angle (NVV) to the height direction (HR).

19 Claims, 1 Drawing Sheet

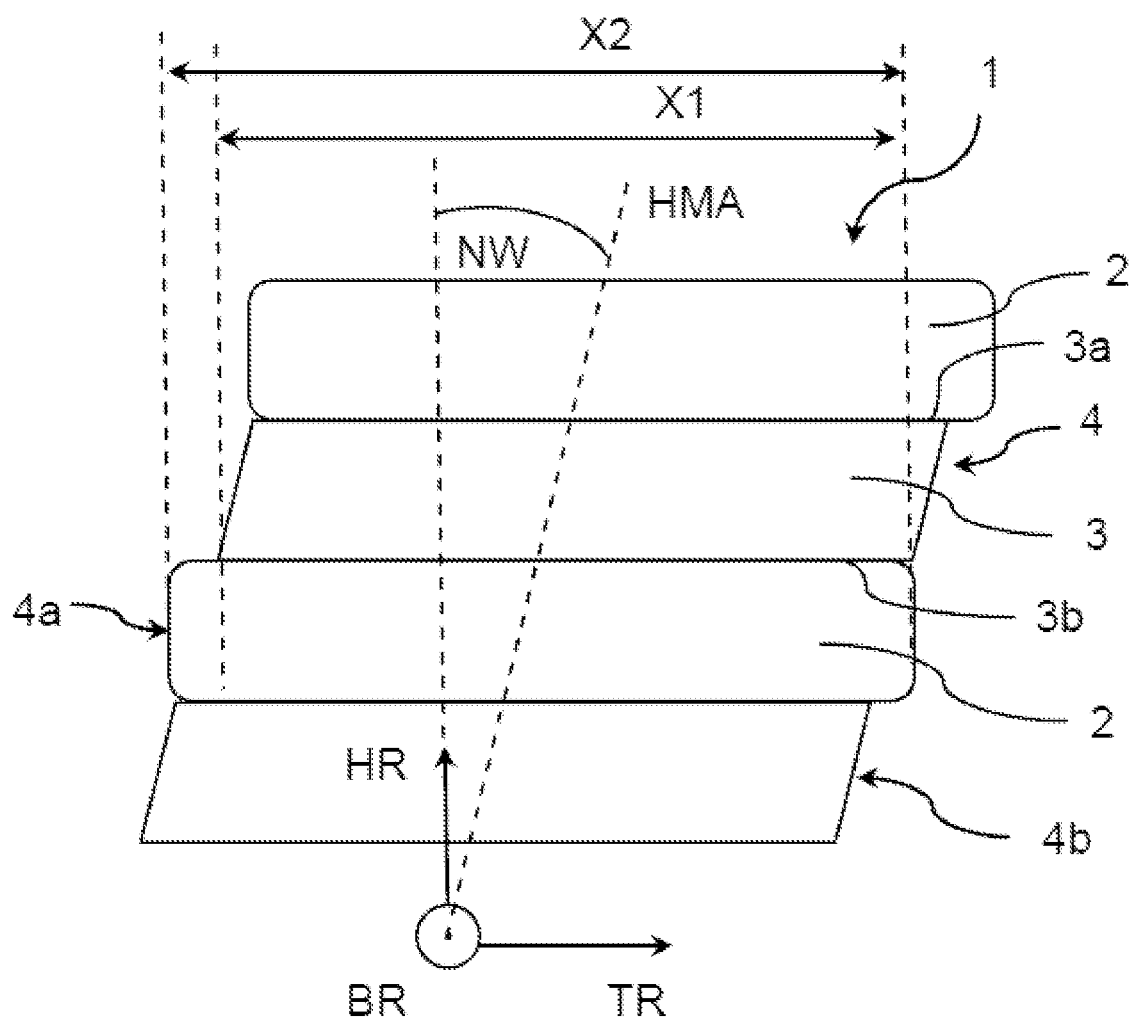

HEAT EXCHANGER WITH TILTED OR NON-VERTICAL ORIENTATION

FIELD

This disclosure relates generally to a heat exchanger for a motor vehicle. More specifically, this disclosure relates to an inclined heat exchanger having a tilted or non-vertical condenser.

BACKGROUND

The statements in this section merely provide background information related to the present disclosure and may not constitute prior art.

In modern motor vehicles, the space available for mounting a heat exchanger is often reduced in comparison to the space occupied by a heat exchanger mounted in an older vehicle model. This creates a problem that can be solved by heat exchanger either being constructed with smaller dimensions or configured to be mounted at an angle. However, in both of these solutions, the amount of air that flows through the heat exchanger may be significantly reduced and not provide the desired performance. It is therefore desirable to provide a heat exchanger that may be mounted in a restricted space and maintain the degree of air-flow that supports the required level of performance.

SUMMARY

The present disclosure generally provides a heat exchanger for use in a motor vehicle. This heat exchanger generally comprises at least two flat tubes through which a liquid flows in a width direction (BR), and at least two corrugated fins through which air flows in a depth direction (TR). The flat tubes and the corrugated fins are stacked one on top of the other alternately in a height direction (HR) to form a stack. The flat tubes and the corrugated fins in the stack are displaced one above the other in the depth direction (TR), such that a height center axis (HMA) of the stack passing through the center of the stack is aligned at an inclination angle (NVV) to the height direction (HR). The height direction (HR), the width direction (BR) and the depth direction (TR) are oriented perpendicular to each other. The inclination angle (NVV) may be between 5° and 85°, alternatively, between 25° and 65°, alternatively, about 30° or about 60°.

According to another aspect of the present disclosure, the flat tubes separated by the corrugated fins overlap only in regions in the depth direction (TR) and completely in the width direction (BR). The corrugated fins and the flat tubes adjacent thereto overlap only in regions in the depth direction (TR) and completely in the width direction (BR). One or more of the flat tubes may project beyond the adjacent flat tube in the depth direction (TR) with an overhang of between 1 mm and 10 mm. alternatively, between 2 mm and 6 mm.

According to yet another aspect of the present disclosure, the stack contains a rhombic cross-section in a plane spanned transversely to the width direction (BR). A cross-section of the stack that is in a plane spanned transversely to the width direction (BR) may contain two edges aligned parallel to the depth direction (TR) and two edges aligned at the inclination angle (NW) to the height direction (HR).

According to another aspect of the present disclosure, the corrugated fins contain a rhombic parallelogram cross-section in a plane spanned transversely to the depth direction (TR). A cross-section of the corrugated fins that is in a plane spanned by the depth direction (TR) and the height direction (HR) may contain two edges aligned parallel to the depth direction (TR) and two edges aligned at the inclination angle (NW) to the height direction.

According to another aspect of the present disclosure, the heat exchanger may further comprise one or more of the following: (i) a distance defined in the height direction (HR) between two adjacent flat tubes that is between 5 mm and 10 mm, alternatively, between 6 mm and 8 mm; (ii) a height defined in the height direction (HR) of the corrugated fins is between 5 mm and 10 mm, alternatively, between 6 mm and 8 mm; (iii) a depth defined in the depth direction (TR) of the flat tubes is between 15 mm and 20 mm, alternatively, between 16 mm and 19 mm, alternatively, about 18.6 mm, and/or (iv) a depth defined in the depth direction (TR) of a contact surface of the corrugated fins aligned transversely with respect to the height direction (HR) is between 25 mm and 30 mm, alternatively, between 27 mm and 28 mm, alternatively, about 27.8 mm.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawing, which is provided as a schematic representation.

FIG. 1 is a partial sectional view of a heat exchanger formed according to the teachings of the present disclosure.

The drawing described herein is for illustration purposes only and is not intended to limit the scope of the present disclosure in any way. Various embodiments of the present disclosure are shown in the drawing and will be explained in more detail in the following description, wherein like reference signs refer to like or similar or functionally identical components or features.

DETAILED DESCRIPTION

The following description is merely exemplary in nature and is in no way intended to limit the present disclosure or its application or uses. For example, the heat exchanger made and used according to the teachings contained herein are described throughout the present disclosure in conjunction with a motor vehicle. The incorporation and use of such a heat exchanger in other heating, ventilation, air conditioning, and refrigeration applications wherein the space for mounting the heat exchanger is limited and the design set forth herein would be desirable is contemplated not to exceed the scope of the present disclosure.

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one fin", "one or more fins", and "fin(s)" may be used interchangeably and are intended to have the same meaning.

For the purpose of this disclosure, the terms "about" and "substantially" are used herein with respect to measurable values and ranges due to expected variations known to those skilled in the art (e.g., limitations and variability in measurements).

Although specific terminology is used herein to describe particular embodiments within the disclosure, this terminology is not intended to limit any portion of the disclosure. For example, as used herein, singular forms of "a", "an", and "the" are intended to include various plural forms as well, unless the context of their use clearly indicates otherwise. Terms, such as "comprises", "includes", "comprising" or "including" are meant to specify the presence of stated features, integers, steps, operations, elements, and/or components, but are not meant to preclude the presence and/or addition of one or more other features, integers, steps, operations, elements, components, and/or groups associated therewith.

The present disclosure addresses the deficiency of the prior art by providing a design for an inclined heat exchanger having a corrugated fin that provides an improvement over or at least an alternative embodiment for a heat exchanger of the generic type, in which the disadvantages described are overcome. The present disclosure is generally based on the idea of forming a heat exchanger in an inclined configuration.

The heat exchanger according to the present disclosure may be provided for a motor vehicle. The heat exchanger contains at least two flat tubes through which a liquid can flow in a width direction and at least two corrugated fins through which air can flow in a depth direction. The flat tubes and the corrugated fins are stacked alternately one above the other in a height direction to form a stack. The height direction, the width direction and the depth direction are thereby aligned perpendicular to each other. According to one aspect of the present disclosure, the flat tubes and the corrugated fins in the stack are shifted one above the other in the depth direction such that a central height axis of the stack passing through the center of the stack is oriented at an inclination angle to the height direction. As a result, the stack of the heat exchanger is formed inclined to the height direction and the air-flow through the corrugated fins in the depth direction is still allowed. Accordingly, the heat exchanger can be arranged in the motor vehicle in a space-saving manner and the air-flow is not negatively affected in the heat exchanger despite the inclined shape.

According to another aspect of the present disclosure, the central height axis of the stack is aligned at the inclination angle to the height direction. The central height axis is an axis that always passes through the center of the stack in any plane spanned transversely to the height direction. The inclination angle may be between 5° and 85°, alternatively, between 25° and 65°, alternatively at about 30° or about 60°. The inclination angle can thereby be adapted to the desired inclination of the heat exchanger or to the available installation space in the motor vehicle.

Advantageously, the respective adjacent flat tubes may overlap each other only in regions in the depth direction and completely in the width direction. In other words, the respective adjacent flat tubes may be arranged displaced one above the other transversely to the height direction. The respective flat tube may project beyond the respective adjacent flat tube in the depth direction with an overhang of between 1 and 10 millimeters (mm), alternatively, between 2 and 6 mm. Moreover, the respective corrugated fin and the respective adjacent flat tube may overlap each other only in regions in the depth direction and completely in the width direction. In other words, the respective corrugated fin and the respective adjacent flat tube may be arranged displaced one above the other transversely to the height direction.

Advantageously, the stack may have a rhombic cross-section in a plane spanned transversely to the width direction. The cross-section of the stack may thereby have, in a plane spanned transversely to the width direction, two edges aligned parallel to the depth direction and two edges aligned at the inclination angle to the height direction. To this end, the respective corrugated fin may have a rhombic cross-section in a plane spanned transversely to the depth direction. In particular, the cross-section of the respective corrugated fin in a plane spanned transversely to the depth direction may have two edges aligned parallel to the depth direction and two edges aligned at the inclination angle to the height direction. It is understood that the edges of the corrugated fin aligned at the inclination angle to the height direction form in regions the edges of the stack aligned at the inclination angle to the height direction.

If the respective corrugated fin contains a rectangular cross-section transverse to the width direction, the edge of the stack oriented at the inclination angle to the height direction is stepped. In other words, the respective corrugated fins protrude from a side surface of the stack. This may cause problems when manufacturing the stack and using the heat exchanger. If the respective corrugated fin contains a rhombic cross-section, the above-mentioned stepped edge of the stack is smoothed and the respective corrugated fins no longer protrude at the side surface of the stack. As a result, the stack is robust and can be manufactured in a simplified manner. In other words, no additional tool is required for manufacturing the heat exchanger according to the invention.

A distance defined in the height direction between two adjacent flat tubes may be between 5 mm and 10 mm, alternatively, between 6 mm and 8 mm. A height of the respective corrugated fin defined in the height direction may be between 5 mm and 10 mm, alternatively, between 6 mm and 8 mm. A depth defined in the depth direction of the respective flat tube may be between 15 mm and 20 mm, alternatively, between 16 mm and 19 mm, alternatively, about 18.6 mm. A depth defined in the depth direction of a contact surface of the respective corrugated fin oriented transversely to the height direction may be between 25 mm and 30 mm, alternatively, between 27 mm and 28 mm, alternatively, about 27.8 mm.

Further important features and advantages of the present disclosure will be apparent hereafter, from the drawing and from the accompanying FIGURE description with reference to the drawing. It is understood that the above features, and those to be explained below, may be used not only in the combination indicated in each case, but also in other combinations or alone, without departing from the scope of the present invention.

Referring to FIG. 1 a view of a section of a heat exchanger 1 according to one aspect of the present disclosure is shown. The heat exchanger 1 comprises a plurality of flat tubes 2 through which a liquid can flow in a width direction (BR) and a plurality of corrugated fins 3 through which air can flow in a depth direction (TR). The flat tubes 2 and the corrugated fins 3 are flat and extend transversely to a height direction (HR).

The flat tubes 2 and the corrugated fins 3 are stacked alternately one above the other in the height direction (HR) to form a stack 4. The respective flat tube 2 rests on a corresponding contact surface 3a or 3b of the corrugated fin 3 and is connected to the corrugated fin 3 by a material bond.

The height direction (HR), the width direction (BR) and the depth direction (TR) refer to the stack 4 and are aligned perpendicular to each other.

The corrugated fins 3 and the respective, adjacent flat tubes 2 are displaced one above the other in the stack 4 in the depth direction (TR). A central height axis (HMA) of the stack 4 is thereby aligned at an inclination angle (NVV) to the height direction (HR), and the stack 4 or the heat exchanger 1 is formed inclined. The inclination angle (NVV) is here in FIG. 1 shown to be about 30°. This allows the heat exchanger 1 to be arranged in the motor vehicle in a space-saving manner. The corrugated fins 3 allow air to flow in the depth direction (TR), so that the air-flow in the inclined heat exchanger 1 according to the present disclosure is not negatively impaired.

The two contact surfaces 3a and 3b of the respective corrugated fin 3 are displaced relative to each other in the depth direction (TR), so that the respective corrugated fin 3 contains a rhombic cross-section transverse to the width direction (BR). As a result, side surfaces 4a and 4b of the stack 4 can be smoothed, since edges of the respective corrugated fins 3 aligned parallel to the width direction (BR) no longer protrude at the side surfaces 4a and 4b of the stack 4.

Still referring to FIG. 1, due to the rhombic cross-section of the corrugated fins 3, more space is also available for the respective flat tube 2 and the conventionally possible depth (X1) of the flat tube 2 can be increased to a depth (X2). With standard dimensions of the flat tubes 2, the conventionally possible depth of the flat tube 2 can be increased from 16.1 mm to about 18.6 mm, for example.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A heat exchanger for use in a motor vehicle, the heat exchanger comprising:
   at least two flat tubes through which a liquid flows in a width direction (BR), and
   at least two corrugated fins through which air flows in a depth direction (TR),
   wherein the flat tubes and the corrugated fins are stacked one on top of the other alternately in a height direction (HR) to form a stack, and the flat tubes and the corrugated fins in the stack are displaced one above the other in the depth direction (TR), such that a height center axis (HMA) of the stack passing through the center of the stack is aligned at an inclination angle (NW) to the height direction (HR),
   wherein the height direction (HR), the width direction (BR) and the depth direction (TR) are oriented perpendicular to each other;
   wherein the inclination angle (NW) is between 5° and 85°.

2. The heat exchanger according to claim 1, wherein the inclination angle (NW) is between 25° and 65°.

3. The heat exchanger according to claim 2, wherein the inclination angle (NW) is about 30° or about 60°.

4. The heat exchanger according to claim 1, wherein the flat tubes separated by the corrugated fins overlap only in regions in the depth direction (TR) and completely in the width direction (BR).

5. The heat exchanger according to claim 1, wherein the corrugated fins and the flat tubes adjacent thereto overlap only in regions in the depth direction (TR) and completely in the width direction (BR).

6. The heat exchanger according to claim 1, wherein one or more of the flat tubes projects beyond the adjacent flat tube in the depth direction (TR) with an overhang of between 1 mm and 10 mm.

7. The heat exchanger according to claim 6, wherein one or more of the flat tubes projects beyond the adjacent flat tube in the depth direction (TR) with an overhang of between 2 mm and 6 mm.

8. The heat exchanger according to claim 1, wherein the overall stack contains a rhombic cross-section in a plane spanned transversely to the width direction (BR).

9. The heat exchanger according to claim 1, wherein a cross-section of the stack that is in a plane spanned by the depth direction (TR) and the height direction (HR) contains two edges aligned parallel to the depth direction (TR) and two edges aligned at the inclination angle (NW) to the height direction (HR).

10. The heat exchanger according to claim 1, wherein a cross-section of the corrugated fins that is in a plane spanned by the depth direction (TR) and the height direction (HR) contains two edges aligned parallel to the depth direction (TR) and two edges aligned at the inclination angle (NW) to the height direction.

11. The heat exchanger according to claim 10, wherein the corrugated fins contain a parallelogram cross-section.

12. The heat exchanger according to claim 1, wherein the heat exchanger further comprises one or more of the following:
    (i) a distance defined in the height direction (HR) between two adjacent flat tubes that is between 5 mm and 10 mm,
    (ii) a height defined in the height direction (HR) of the corrugated fins is between 5 mm and 10 mm,
    (iii) a depth defined in the depth direction (TR) of the flat tubes is between 15 mm and 20 mm, and/or
    (iv) a depth defined in the depth direction (TR) of a contact surface of the corrugated fins aligned transversely with respect to the height direction (HR) is between 25 mm and 30 mm.

13. The heat exchanger according to claim 12, wherein the distance defined in the height direction (HR) between two adjacent flat tubes is between 6 mm and 8 mm.

14. The heat exchanger according to claim 12, wherein the height defined in the height direction (HR) of the corrugated fins is between 6 mm and 8 mm.

15. The heat exchanger according to claim 12, wherein the depth defined in the depth direction (TR) of the flat tubes is between 16 mm and 19 mm.

16. The heat exchanger according to claim 15, wherein the depth defined in the depth direction (TR) of the flat tubes is about 18.6 mm.

17. The heat exchanger according to claim 12, wherein the depth defined in the depth direction (TR) of a contact surface of the corrugated fins aligned transversely with respect to the height direction (HR) is between 27 mm and 28 mm.

18. The heat exchanger according to claim 17, wherein the depth defined in the depth direction (TR) of a contact surface of the corrugated fins aligned transversely with respect to the height direction (HR) about 27.8 mm.

19. The heat exchanger according to claim 12, wherein the heat exchanger further comprises one or more of the following:
- (i) a distance defined in the height direction (HR) between two adjacent flat tubes that is between 6 mm and 8 mm,
- (ii) a height defined in the height direction (HR) of the corrugated fins is between 6 mm and 8 mm,
- (iii) a depth defined in the depth direction (TR) of the flat tubes is between 16 mm and 19 mm, and/or
- (iv) a depth defined in the depth direction (TR) of a contact surface of the corrugated fins aligned transversely with respect to the height direction (HR) is between 27 mm and 28 mm.

* * * * *